May 1, 1928.
J. D. LANGDON
1,668,278
RECIPROCATING ELECTRIC MOTOR
Filed Oct. 8. 1926
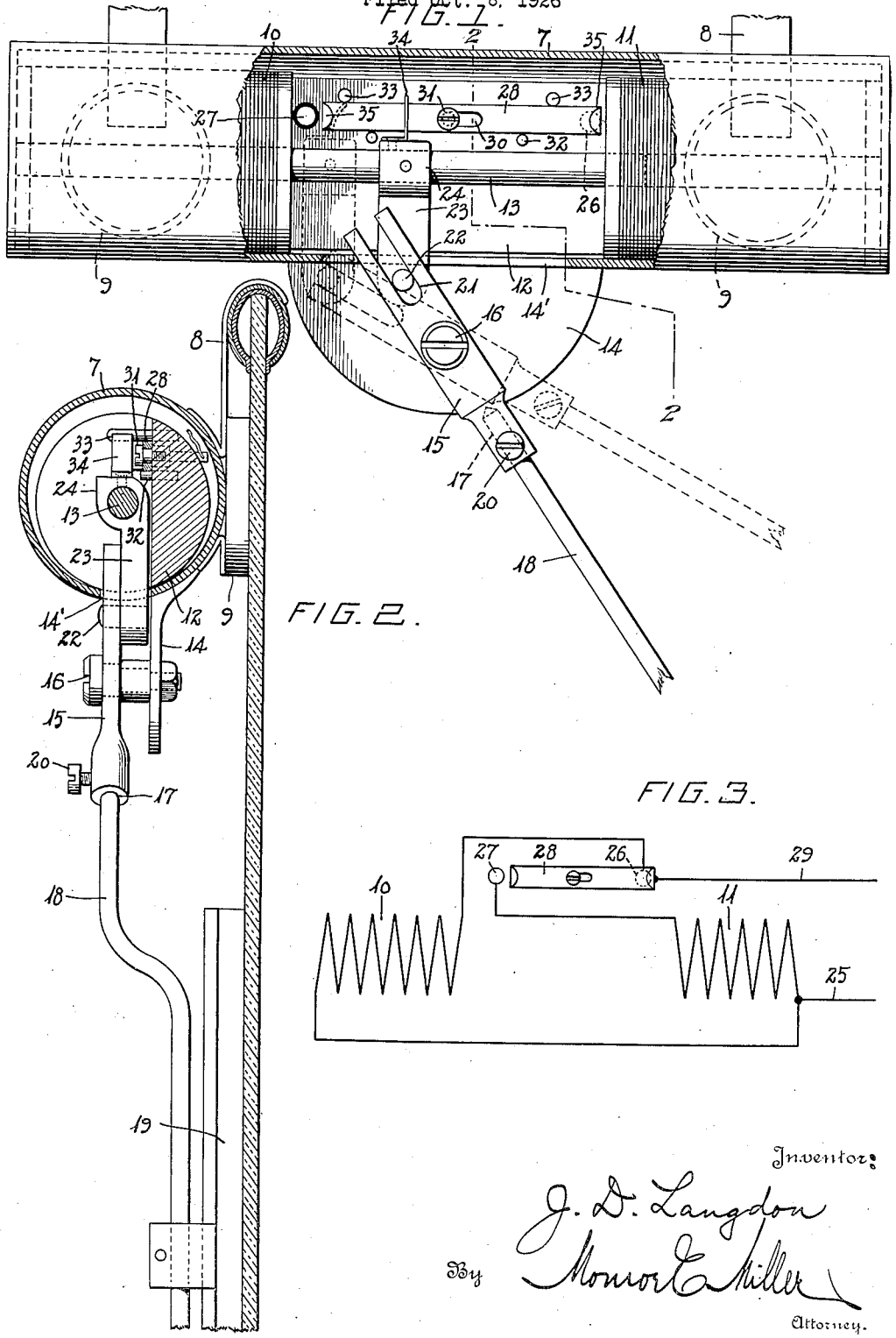
Inventor:
J. D. Langdon
By Monroe E. Miller
Attorney.

Patented May 1, 1928.

1,668,278

UNITED STATES PATENT OFFICE.

JESSE D. LANGDON, OF LOS ANGELES, CALIFORNIA, ASSIGNOR TO LANGDON ENGINEERING CORPORATION, OF LOS ANGELES, CALIFORNIA.

RECIPROCATING ELECTRIC MOTOR.

Application filed October 8, 1926. Serial No. 140,304.

The present invention relates to reciprocating electric motors, and aims to provide a novel and improved electric motor of the reciprocating type.

One object of the invention is the provision of an electric motor comprising a core or plunger reciprocated by opposed solenoids and having novel means for changing the circuit connections of said solenoids in order to change from either solenoid to the other in an effective manner without the liability of the motor stopping or stalling.

Another object is the provision of a novel electric switch device operated by a reciprocating member and having provisions for reversing the switch with a sharp or snapping action at the limits of movement of the reciprocatory member, in order to keep the motor operating in an efficient manner.

A further object is the provision of a novel operative connection between an oscillatory or pivoted member and the reciprocating core or plunger of the motor, for oscillating said member in an efficient manner.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a front view of the improved motor, portions being broken away.

Fig. 2 is a section on the line 2—2 of Fig. 1, portions being shown in elevation.

Fig. 3 is a diagrammatical view showing the solenoid coils and switch controlling the circuits thereof.

The motor is enclosed within a tubular or cylindrical casing 7, which may be divided for assembling the parts therein, and, as shown, the motor is used as a part of a windshield wiper for automobiles. Thus, the casing 7 is disposed in a horizontal position in front of the windshield, and has upstanding hooks 8 to engage over the upper edge of the windshield, as seen in Fig. 2. The casing also has vacuum cups 9 of rubber or other resilient material on the back side of the casing to adhere to the windshield glass and thereby hold the device in place.

Opposite solenoids 10 and 11 are disposed within the casing 7, the windings or coils thereof being disposed on spools as usual which are connected by a yoke 12 disposed in rear of the core or plunger 13 which is slidable in the solenoids to be reciprocated longitudinally of the casing.

A wing or plate 14 depends from the casing 7 in rear of a slot 14' in the bottom of the casing, and a lever 15 is pivoted, as at 16, to said wing 14. The lower arm of the lever has a socket 17 for receiving the rod or stem 18 of a squeegee 19 of a windshield wiper, and the stem or rod 18 is secured in said socket by means of a set screw 20. The upper arm of the lever 15 has an open longitudinal slot 21 receiving a pin or stud 22 outstanding from a depending arm 23 of a collar 24 secured on the core or plunger 13, whereby the reciprocatory movement of the core 13 is converted into the oscillatory motion of the lever 15, it being noted that the pin or stud 22 is closest to the pivot 16 in the intermediate position of the core 13 and moves farther away from the pivot 16 toward the opposite limits of movement of the core, whereby the relative motion of the core and lever is varied to conform to the magnetic force in moving the core in either direction. The squeegee 19 or other device operated is therefore moved with an accelerating and decelerating motion during each stroke thereof. Thus, the magnetic flux of either solenoid has its greatest force and effect on the core 13 at the intermediate position of said core, at which point the pin or stud 22 is closest to the pivot 16, and the relative angular velocity of the lever decreases as the core 13 moves in either direction from its intermediate position to compensate for the diminishing magnetomotive force. Conversely, as the core moves from either extreme limit of movement toward intermediate position the relative angular velocity of the lever increases to conform to the increasing magnetomotive force. The arm 23 and upper arm of the lever 15 work in the slot 14' of the casing, and it will be apparent that the lever 15 may be used for operating the squeegee 19 or any other device. In fact, the motor may be employed for various purposes for which it is suitable.

One terminal of each solenoid is connected to a wire or conductor 25, as seen in Fig. 3, leading to one pole of a battery or other source of direct current, and the other terminals of said solenoids are connected to the respective contacts 26 and 27 mounted in the yoke 12 and insulated therefrom. A reciprocating switch 28 is connected to the other wire or conductor 29 leading to the source of direct current, so that by reciprocating the switch 28 to extend across and engage the contacts 26 and 27 alternately, the solenoids 10 and 11 are alternately energized.

As shown, the contacts 26 and 27 are embedded in the yoke 12, and the switch 28 is in the form of a bar sliding along the face of said yoke so that the terminals of the switch may be projected across the contacts. The switch 28 has a longitudinal slot 30 between its ends receiving a holding screw 31 engaging in the yoke, and the lower edge of the switch 28 rides on lugs or pins 32 carried by the yoke 12. Other pins 33 project from the yoke across the upper edge of the switch 28, and project beyond said switch into the path of an upstanding leaf spring or finger 34 secured on the collar 24. The switch 28 has the outstanding lugs 35 at its ends formed with rounded surfaces for the contact of the spring finger 34 when the core 13 reaches the limits of its reciprocatory movement.

In operation, assuming the switch 28 to be moved toward the right, as seen in Figs. 1 and 3, over the contact 26, this will close the circuit of the solenoid 10 so that the core 13 is moved toward the left. The finger 34 contacts with the left hand pin 33 and is sprung in one direction, as seen in dotted lines in Fig. 1, in moving under said pin into contact with the left hand lug 35 of the switch. During this flexing of the spring finger 34 the solenoid 10 is pulling the core 13, and when the end of the finger 34 passes under the pin 33, and said finger is released it will rebound thereby exerting its force on the left hand lug 35 of the switch, so as to move the switch with a sharp or quick motion toward the left, thereby removing the switch 28 from the contact 26 and moving the switch over the contact 27, and using the inertia of the parts to complete the reversal of the switch. The switch 28 engaging the contact 27 and being removed from the contact 26, will now energize the solenoid 11, to move the core 13 toward the right, and when the core 13 reaches the limit of its movement toward the right the spring finger 34 will be flexed under the right hand pin 33, so as to spring against the right hand lug 35 and reverse the switch in substantially the same manner as above described. Thus, as the core 13 is moved by the corresponding solenoid it will, during the latter part of its movement, bring the spring finger 34 under a bending strain, so that further movement of the core and release of the finger 34 will result in the switch being reversed by a sharp movement, which will not be interfered with by the reversal in the energization of the solenoids. The motor will therefore operate efficiently and will not stop or become stalled at the limits of movement of the core or reciprocatory member.

Having thus described the invention, what is claimed as new is:—

1. An electric motor comprising opposed solenoids, a core movable therein, a reversing switch controlling the circuits of the solenoids, spring means, and means arranged for bringing the spring means under strain when the core moves past two positions and then releasing the spring means during the completion of the movement of the core in either direction, said spring means being arranged, when released, to reverse the switch and being unaffected by the last named means when moving between said positions.

2. An electric motor comprising opposed solenoids, a core movable therein, a reversing switch controlling the circuits of the solenoids, a spring finger movable with the core, members in the path of said finger for flexing and then releasing the finger during the completion of the movement of the core in either direction, said switch having portions for the contact of said finger when released so as to reverse the switch by the rebound of said finger.

3. An electric motor comprising opposed solenoids, a core movable therein, a yoke between said solenoids, a reversing switch slidably mounted on said yoke and controlling the circuits of said solenoids, a spring finger movable with said core, and pins carried by said yoke and arranged in the path of movement of said finger to flex and then release said finger during the completion of the movement of the core in either direction, said switch having portions for the contact of said finger when released to reverse the switch by the rebound of said finger.

4. An electric motor comprising opposed solenoids, a core movable therein, a reversing switch controlling the circuits of the solenoids, spring means movable with the core and means arranged for bringing the spring means under strain when moved beyond two points and then releasing same during the completion of the movement of the core in either direction, the spring means being arranged, when released, to reverse said switch and being unaffected by the last named means when moving between said points.

In testimony whereof I hereunto affix my signature.

JESSE D. LANGDON.